United States Patent [19]

Okrent

[11] 4,155,087

[45] May 15, 1979

[54] RADAR RECEIVER FOR DETECTING CODED INFORMATION BURIED IN RADAR ECHOES

[75] Inventor: Jasper J. Okrent, Port Washington, N.Y.

[73] Assignee: The United States of America as represented by the Secretary of the Army, Washington, D.C.

[21] Appl. No.: 354,552

[22] Filed: Apr. 20, 1973

[51] Int. Cl.$^2$ ............................................. H01Q 15/00
[52] U.S. Cl. ...................................... 343/7.6; 325/323; 325/473; 343/6.5 R; 343/18 D
[58] Field of Search .............................. 325/323, 473; 343/6.5 R, 7.6, 18 D

[56] References Cited

U.S. PATENT DOCUMENTS

| | | | |
|---|---|---|---|
| 3,134,896 | 5/1964 | Briggs | 325/473 X |
| 3,303,425 | 2/1967 | Pendleton | 325/473 X |

Primary Examiner—T. H. Tubbesing
Attorney, Agent, or Firm—Nathan Edelberg; Sheldon Kanars; Jeremiah G. Murray

[57] ABSTRACT

An IFF radar system having a processor for analyzing radar reflections to determine if the reflections were artificially modulated by a cooperative target in accordance with some predetermined code. The processor ignores modulations in the radar reflections due to Doppler shifts. The amplitude of the detected target return is sampled and held in the radar receiver. The resulting signal is fed to the processor. The signal is then (half or full wave) rectified, the DC removed and then correlated in a multiplier with the predetermined coded signal, which is generated in the processor. The output of the multiplier is then integrated. If there has been a modulation of the reflected energy exactly in accordance with the predetermined code, then the output of the integrator will increase to a point detected by a threshold device. Although there will be modulations in the received signal due to the Doppler effect, the rate and phase of these modulations will be such that the time integral over a given time will be small or nonexistent.

7 Claims, 10 Drawing Figures

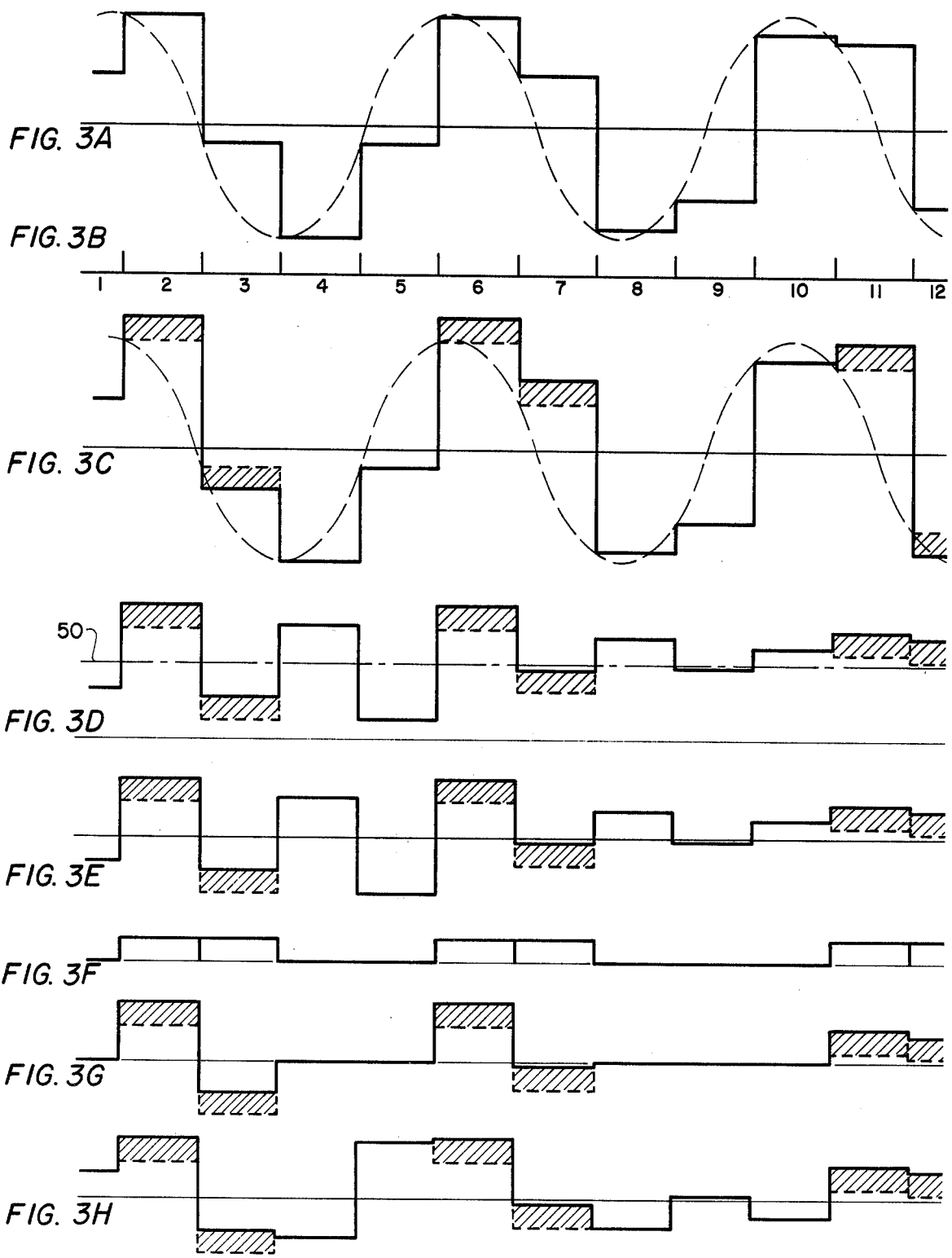

RADAR RECEIVER FOR DETECTING CODED INFORMATION BURIED IN RADAR ECHOES

BACKGROUND OF THE INVENTION

The present invention relates to a radar and more particularly to radar systems having means for detecting coded information buried in radar echoes.

In the field of radar surveillance, IFF systems (identification friend or foe) have been proposed wherein friendly or cooperative targets are equipped with devices which artificially modulate radar reflections for the purpose of transmitting identification information in coded form from the target back to the radar receiver. Because an artificially modulated radar reflection from a friendly or cooperative target will appear in most respects as a common radar reflection, the code will be difficult to decipher. It has been generally known that an artificially modulated reflection is usually complicated by Doppler shifts of the natural and artificial signals caused by relative movements of the targets. Previously proposed methods of detection of the coded signal at the radar receiver by a correlation process required complicated and expensive Doppler filtering devices to extract the coded information. Therefore, those concerned with the improving of such devices have recognized the need for a more simple and effective detection circuit which is relatively immune to the Doppler effects. The present invention fulfills this need.

SUMMARY OF THE INVENTION

The present invention contemplates a unique signal processing system which is insensitive to Doppler shifts of the reflected signals. The general purpose of the invention is to provide a radar system which is capable of performing the function of extracting the predetermined coded information buried in the radar echo without the use of complex Doppler filtering circuitry. To attain this, the present invention contemplates a unique signal processor which prepares the received echo such that it may be directly correlated with a predetermined coded signal generated at the receiver even in the presence of Doppler frequencies.

DESCRIPTION OF THE DRAWINGS

The exact nature of this invention, as well as other objects and advantages thereof, will be readily apparent from consideration of the following specification relating to the annexed drawing in which:

FIGS. 3A to 3H show waveforms helpful in describing the operation of the processor shown in FIG. 2.

DETAILED DESCRIPTION OF THE PREFERRED EMBODIMENT

Figure 1:
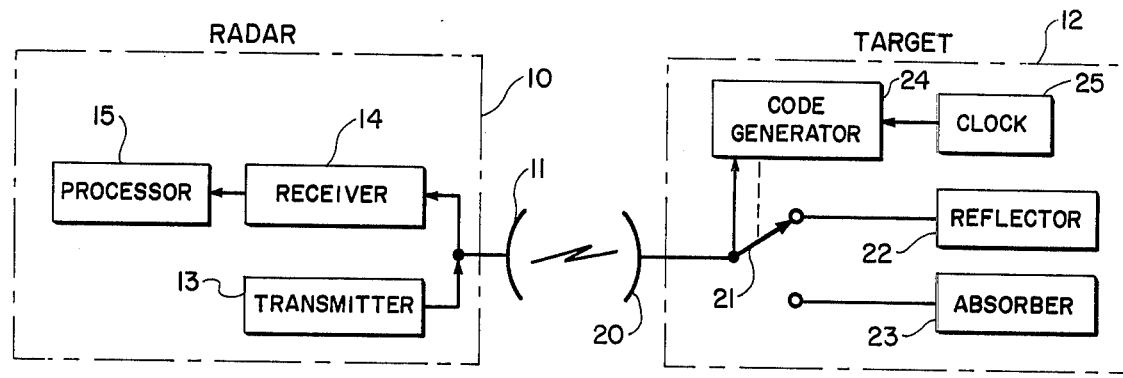
FIG. 1 shows a block diagram of the general radar system.

Referring now to the drawings, there is shown in FIG. 1 a radar system which includes a radar 10, e.g. a non-coherent pulse doppler radar, for transmitting radar pulses via an antenna 11 to a target 12. The radar 10 includes a radar transmitter 13, receiver 14, and a signal processor 15. The friendly or cooperative target 12 will include a radar signal reflector, such as illustrated by antenna 20, connected via switch 21 to a terminating reflective impedance 22 or absorber impedance 23. The switch 21 is operated by a code generator 24 synchronized by a clock 25.

In general, the operation of the radar system in FIG. 1 is as follows. Radar 10 generates a series of radar pulses which are transmitted from transmitter 13 via antenna 11 to the target 12, wherein a certain proportion of the radar energy is reflected and then received by radar 10 via antenna 11 and receiver 14. The reflected energy may be used by the radar receiver 14 to display the location of the target 12 in the usual manner that is customary for pulse radar systems. The amount of energy reflected from the target 12, which for example may be a truck in motion, will be a function of the reflective characteristics of the entire target 12 including antenna 20. Because the antenna 20 may be either a reflector or absorber, depending on the position of switch 21, the total reflective characteristics of target 12 may be varied at will. Antenna 20 may be any one of a number of common directional antennas having a substantial aperture, such that a significant proportion of the total energy reflected from target 12 will be effected thereby.

When operating, radar 10 would transmit a series of pulses towards target 12, which in turn would reflect a portion of the energy back towards radar 10 and receive a portion of the energy via antenna 20. After receiving some predetermined number of radar pulses, code generator 24 is enabled to operate switch 21 in accordance with the predetermined code. Therefore, the energy received by antenna 20 will be periodically absorbed and reflected depending on the position of switch 21. As a result the reflected energy from target 12, as a whole, will be amplitude modulated in accordance with the predetermined code. However, due to the Doppler effect, any energy reflected from target 12 will also be frequency modulated or shifted, if there is a relative velocity between the radar 10 and target 12.

As is common to standard pulse radars, the reflected signal from target 12 will usually be heterodyned in a mixer stage to obtain a video pulse train. In general, the video pulses appearing at the output of the mixer will be amplitude modulated for two reasons. First, the amplitude of these pulses will vary at a difference frequency equal to the difference between the reflected signal frequency and the reference signal frequency, which in this case will equal the Doppler frequency. Second, the amplitude of the pulses will vary because the amount of energy in the received signal will have been artificially modulated by target 12, as was explained earlier. It is the information contained in the amplitude modulation due to the second effect which must be detected by the processor 15. The amplitude modulation due to the Doppler effect must therefore be eliminated or ignored.

Of course, if there is no Doppler frequency, i.e. there is no relative velocity, then detection of the coded information by processor 15 would be simple, since the code would simply be equal to the amplitude modulation. Also, if the amount of Doppler shift in frequency is known, then detection of the code by processor 15 could be accomplished by filtering out the Doppler frequency component and then detecting the amplitude modulation. However, in the general case, an unknown Doppler frequency component is usually present in the received signal.

Figure 2:
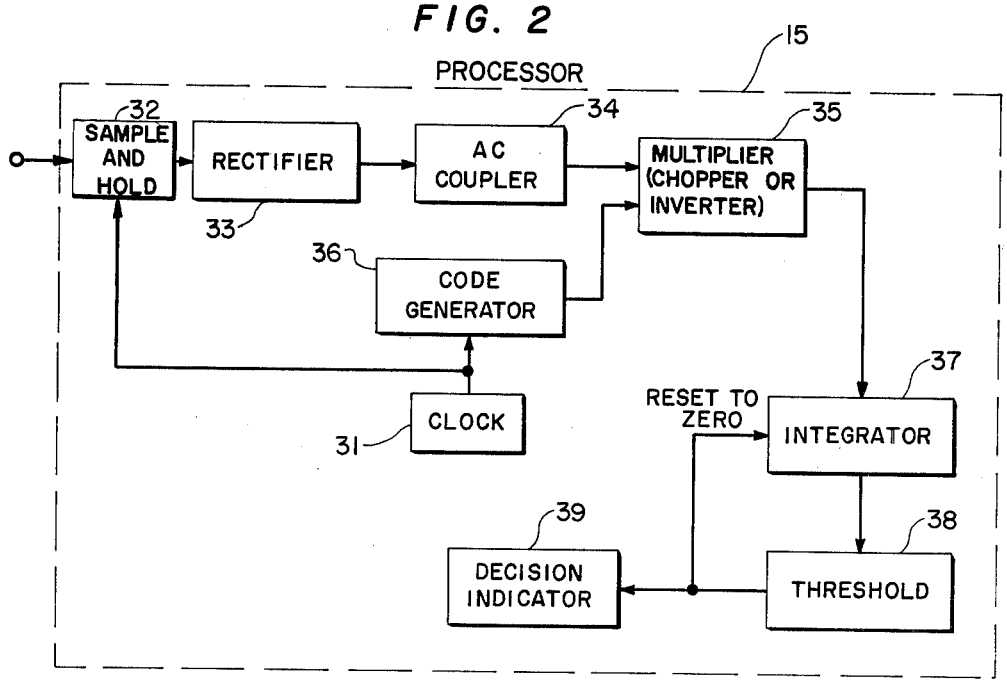
FIG. 2 shows a block diagram of the processor shown in FIG. 1.

The processor 15 of FIG. 2 uses a code detection technique which is insensitive to Doppler frequencies. The description of the processor 15 in FIG. 2 will now be presented with the aid of the waveforms shown in FIGS. 3A to 3H.

The signal in FIG. 3A shows a dashed line portion representing the envelope variations of the video pulse train from target 12 as detected in receiver 14. As mentioned earlier, the envelope variations, in general, are a result of both the Doppler component and the artificially modulated reflections. The variations represented by the dashed line in FIG. 3A represents a typical amplitude modulation caused by Doppler effects only.

For purposes of discussion, the relative velocity variations between the target 12 and radar 10 is considered to be very small or zero for the period shown in FIG. 3A. Therefore, the dashed line in FIG. 3A is drawn as a pure sine wave. As is well-known, it is common for pulse radar receivers to contain an envelope detector and a sample-and-hold circuit or box car circuit normally operating at the PRF (pulse repetition frequency) of the transmitter and at a relative phase thereto dictated by the particular range of target 12. Either the output of the usual sample-and-hold circuit or the envelope detector in receiver 14 may be applied directly to processor 15. If the output of the envelope detector in receiver 14 is used, the input to processor 15 may be connected to the input of the sample-and-hold circuit 32 which samples the envelope variations from a single target at the rate of clock 31 having an output signal as shown in FIG. 3B. The output of sample-and-hold circuit 32 or the input to rectifier 33 would then look like the solid line rectangular wave in FIG. 3A. It is to be noted, however, that the sampling rate may be greater than that shown in FIG. 3A and is shown equal to the rate of the coded signal for convenience only.

On the other hand, the input to rectifier 33 would in most cases come directly from the box car circuit usually found in the radar receiver 14. Although, the input to rectifier 33 would still be a rectangular wave having pulses which followed the envelope in FIG. 3A, in this case the number of pulses would usually be greater and the pulse width would usually be much shorter since the PRF of the radar would in general be greater than the basic PRF of the coded signal, i.e. the rate of clocks 31 and 35.

FIG. 3C repeats the dashed line envelope variations shown in FIG. 3A and superimposes a solid line rectangular wave thereon, which represents a typical output from sampling circuit 32, when the amplitude of the reflected video pulse train is effected by both the Doppler variations and the coded variations due to the artificially modulated reflections.

During those clock periods when the amount of reflected energy is increased as a result of the code, the amplitude of the envelope variations will be increased both negatively and positively. The increase in the amplitude of the envelope due to the artificially modulated reflections is represented by the cross hatched areas in FIGS. 3C, 3D, 3E, 3G and 3H. The horizontal dashed lines in these figures represent amplitude variation of the output of the sampling circuit 32 when there are no artificially modulated reflections. It has been assumed for purposes of discussion that, in accordance with the code, the switch 21 in target 12 is connected to the reflector 22 during the following clock periods; 2, 3, 6, 7, 11 and 12; and is connected to the absorber 23 during the following clock periods: 1, 4, 5, 8, 9 and 10. In binary notation the code of the artificially modulated reflections may be expressed as follows: 011001100011. Of course, this example shows only twelve bauds for simplicity and in actual practice the code would extend over considerably more bauds.

The output of sampling circuit 32 is connected to the input of a full wave rectifier 33 (a half-wave rectifier may also be employed), producing the output wave shown in FIG. 3D. The output of rectifier 33 has a DC component represented by the horizontal line 50 in FIG. 3D. Rectification is followed by AC coupling in AC coupler 34 to produce the waveform of FIG. 3E which is free of the DC component.

The coded identification signal generated by code generator 24 is also generated substantially in phase therewith in processor 15 by a code generator 36 under the influence of clock 31 and produces the output signal shown in FIG. 3F. Several methods may be used to achieve approximately equal phase of the output of code generator 36 and the output of AC coupler 34. For example, clocks 25 and 31 and associated code generators 24 and 36 may all be started or synchronized at some suitable initialization time after which they run continuously in phase.

The outputs from AC coupler 34 and code generator 36 are applied to a multiplier 35, having the output signals shown in FIG. 3G or FIG. 3H.

The output of multiplier 35 is fed to integrator 37, wherein the time integral over a given period of the output is generated. A threshold circuit 38, connected to the output of integrator 37, produces an output pulse when the time integral of the output of multiplier 35 reaches a given value. The output of threshold 38 is used to reset the integrator 37 to zero and to energize the indicator 39 when the given value is reached.

The waveform shown in FIG. 3G represents the result of multiplying, in multiplier 35, the waveform of FIG. 3E by the value one when a pulse appears in the waveform of FIG. 3F and by zero at all other times. In this case, the multiplier 35 may simply be a chopper which passes the signal of FIG. 3E when the input from code generator 36 is positive and blocks the signal at all other times.

It can be seen from the waveform in FIG. 3G that, when there are no artificially modulated reflections, the time integral will be small or nonexistent. This can be seen by observing in FIG. 3G that, over the long run, there will be as much energy contained in the positive pulses as in the negative pulses represented by the horizontal dashed lines. However, when there have been artificially modulated reflections in the received signal in accordance with the code, the effect is to shift the amplitude of all of the pulses appearing in the waveform of FIG. 3G in a positive direction, i.e. from the dashed lines to the solid lines. Therefore, there will be a substantial net positive time integral associated with the waveform of FIG. 3G.

Therefore, when the radar reflections are artificially modulated in exact accordance with the predetermined code of FIG. 3F, the output of integrator 37 will quickly reach some positive value, which may be detected by threshold 38. The output of threshold 38 is used to reset integrator 37 and to energize an indicator 39. Indicator 39 may be a simple light or may be a more complex device coupled to the radar screen for indicating the type of targets displayed thereon.

The solid line waveform of FIG. 3E, which has no net DC component because of the AC coupler 34, contains a first set of pulses (those associated with the crosshatch) having a net positive DC component or time integral, and a second set of pulses having an equal and opposite net DC component or time integral. Therefore, either set of pulses could have been multiplied by one and used by integrator 37 to determine if the correct coded information is present. However, a more reliable signal from integrator 37 could be obtained by implementing multiplier 35 with an inverter which inverted only those portions of the signal in FIG. 3E in phase with the zero portions of the signal in FIG. 3F and simply passed the other portions. The multiplier would then in effect be multiplying alternately the output of AC coupler by one and minus one in accordance with the predetermined code. The output of the inverter would then look like the waveform in FIG. 3H. The value of the time integral of the waveform in FIG. 3G is dependent on the rate of occurrence (duty factor) of logical ones or pulses in the coded signal of FIG. 3F, shown as 50%. The duty factor and therefore the time integral are increased when the inverter is used because the time integral for the signal of FIG. 3H is obtained for all of the pulses rather than just those pulses appearing in phase with the positive pulses in the waveform of FIG. 3F.

It has also been found that the balanced operation resulting from use of the inverter decreases disturbing effects of low Doppler frequency components and rapid signal level changes.

It should be understood, of course, that the foregoing disclosure relates to only a preferred embodiment of the invention and that numerous modifications or alterations may be made therein without departing from the spirit and the scope of the invention as set forth in the appended claims.

What is claimed is:

1. A signal processor for detecting the presence in a given signal of an amplitude modulation in accordance with a predetermined code comprising:
   an input terminal means;
   a clock means for generating timing pulses;
   a sampling means connected to said input terminal means and said clock means for generating a series of pulses having amplitudes proportional to the values of the signals on said input terminal means at a series of points in phase with said timing pulses;
   rectifier means connected to the output of said sampling means for rectifying the output thereof;
   AC coupler means connected to said rectifier means for removing the DC component from the output thereof;
   pulse code generator means connected to said clock means for generating a pulse coded signal in accordance with said predetermined code;
   multiplier means connected to the outputs of said pulse code generator means and said AC coupler means for producing an output signal proportional to the product of the output of said AC coupler means and said pulse coded signal;
   integrator means connected to said multiplier means for summing the output thereof over a predetermined time period; and
   threshold means connected to the output of said integrator means for resetting said integrator means and providing an output pulse when the output of said integrator means exceeds a predetermined value in said predetermined time period.

2. The device according to claim 1 and wherein said multiplier means includes a chopper means for selectively passing portions of the output of said AC coupler means in accordance with said predetermined code.

3. The device according to claim 1 and wherein said multiplier means includes an inverter means for selectively passing and inverting different portions of the output of said AC coupler means in accordance with said predetermined code.

4. A signal processor for detecting the presence in a given signal of an amplitude modulation in accordance with a predetermined code comprising:
   an input terminal means;
   a clock means for generating timing pulses;
   a sampling means connected to said input terminal means and said clock means for generating a series of pulses having amplitudes proportional to the values of the signals on said input terminal means at a series of points in phase with said timing pulses;
   rectifier means connected to the output of said sampling means for rectifying the output thereof;
   pulse code generator means connected to said clock means for generating a pulse coded signal in accordance with said predetermined code;
   means including inverter means connected to the outputs of said pulse code generator means and said rectifier means for selectively passing and inverting different portions of the output of said rectifier means and said pulse coded signal in accordance with said predetermined code;
   integrator means connected to said last mentioned means for summing the output thereof over a predetermined time period; and
   threshold means connected to the output of said integrator means for resetting said integrator means and providing an output pulse when the output of said integrator means exceeds a predetermined value.

5. A radar system wherein radar reflections are artificially modulated by cooperative targets according to a predetermined code comprising:
   a radar transmitter for transmitting radar pulses;
   a radar receiver for receiving reflections of said radar pulses and including means for providing a video pulse train having an amplitude modulation in proportion to the amount of energy received in said reflections;
   a clock means for generating timing pulses;
   sampling means connected to the output of said radar receiver and said clock means for generating a series of rectangular pulses having amplitudes proportional to the values of the envelope of said video pulse train at a series of points;
   rectifier means connected to the output of said sampling means for rectifying the output thereof;
   AC coupler means connected to said rectifier means for removing the DC component from the output thereof;
   pulse code generator means connected to said clock means for generating a pulse coded signal in accordance with said predetermined code and in a predetermined phase with said reflections;
   multiplier means connected to the outputs of said pulse code generator means and said AC coupler means for producing an output signal proportional to the product of the output of said AC coupler means and said pulse coded signal;
   integrator means connected to the output of said multiplier means for summing the output thereof over a predetermined time period;
   threshold means connected to the output of said integrator means for resetting said integrator means and providing an output pulse when the output of said integrator means goes above a predetermined value in said predetermined time period; and indicator means connected to the output of said threshold means for indicating the presence of said predetermined code in said reflections.

6. The device according to claim 5 and wherein said multiplier means includes a chopper means for selectively passing portions of the output of said AC coupler means in accordance with said predetermined code.

7. The device according to claim 5 and wherein said multiplier means includes an inverter means for selectively passing and inverting different portions of the output of said AC coupler means in accordance with said predetermined code.

* * * * *